(12) United States Patent
Hartman et al.

(10) Patent No.: US 9,953,234 B2
(45) Date of Patent: Apr. 24, 2018

(54) COMPRESSOR CONDUIT LAYOUT SYSTEM

(71) Applicant: Ingersoll-Rand Company, Davidson, NC (US)

(72) Inventors: Ryan D. Hartman, Charlotte, NC (US); Michael Peters, Mooresville, NC (US)

(73) Assignee: Ingersoll-Rand Company, Davidson, NC (US)

( * ) Notice: Subject to any disclaimer, the term of this patent is extended or adjusted under 35 U.S.C. 154(b) by 24 days.

(21) Appl. No.: 15/267,867

(22) Filed: Sep. 16, 2016

(65) Prior Publication Data
US 2018/0082141 A1    Mar. 22, 2018

(51) Int. Cl.
G06K 9/00    (2006.01)
G06K 9/22    (2006.01)
G06K 9/20    (2006.01)
G06K 9/62    (2006.01)
G06T 17/05   (2011.01)

(52) U.S. Cl.
CPC ............. *G06K 9/22* (2013.01); *G06K 9/209* (2013.01); *G06K 9/2081* (2013.01); *G06K 9/6288* (2013.01); *G06T 17/05* (2013.01); *G06T 2200/08* (2013.01)

(58) Field of Classification Search
CPC ........ G06K 9/22; G06K 9/209; G06K 9/2081; G06K 9/6288; G06T 17/05; G06T 2200/08
See application file for complete search history.

(56) References Cited

U.S. PATENT DOCUMENTS

| | | | |
|---|---|---|---|
| 6,912,489 B1 | 6/2005 | Luitwieler | |
| 7,209,870 B2 * | 4/2007 | Simmons | B60H 1/00642 236/46 R |
| 8,036,604 B2 | 10/2011 | McFarland | |
| 8,220,484 B2 * | 7/2012 | Howitt | E03F 7/00 137/551 |
| 8,571,841 B2 * | 10/2013 | Meiners | A01B 79/005 172/4.5 |
| 8,725,475 B2 | 5/2014 | Zhang et al. | |
| 8,762,110 B2 | 6/2014 | Egbertson et al. | |
| 8,874,413 B2 * | 10/2014 | Mulligan | G06F 17/509 703/2 |

(Continued)

OTHER PUBLICATIONS

Extended European Search Report, European Patent Application No. 17191305.6, dated Jan. 3, 2018, 9 pages.

*Primary Examiner* — John Strege
(74) *Attorney, Agent, or Firm* — Taft Stettinius & Hollister LLP

(57) ABSTRACT

A compressor conduit layout system is disclosed which includes a handheld device operating in conjunction with a computer based application to obtain data of a conduit system and display a model of the system. The handheld device can include a range finder, a designator used to designate a point of interest so that the range finder can determine a distance between the point of interest and the handheld device, as well as a sensor(s) useful to determine an orientation of the handheld device. The computer based application can include a pallet-and-canvas type application which displays a computer model of the conduit system. The compressor conduit layout system can use or can alternatively include an indoor positioning system useful to determine the position of the handheld device.

22 Claims, 6 Drawing Sheets

(56) References Cited

U.S. PATENT DOCUMENTS

| | | | |
|---|---|---|---|
| 2002/0147958 A1* | 10/2002 | Teig | G06F 17/5077 716/129 |
| 2015/0117154 A1* | 4/2015 | Kwak | H04B 11/00 367/118 |
| 2015/0178953 A1* | 6/2015 | Gao | G06F 17/2765 345/681 |
| 2015/0363543 A1* | 12/2015 | Mansouri | G06Q 10/0637 703/7 |
| 2016/0069690 A1 | 3/2016 | Li et al. | |
| 2016/0217578 A1* | 7/2016 | Can | G01V 3/12 |
| 2016/0245646 A1 | 8/2016 | Hart | |

* cited by examiner

COMPRESSOR CONDUIT LAYOUT SYSTEM

TECHNICAL FIELD

The present invention generally relates to layout systems capable of detecting position of components, and more particularly, but not exclusively, to compressor layout systems using a handheld device to capture position information.

BACKGROUND

Two dimensional schematics of compressed air systems can be made using a pallet and canvas style software tool where the user clicks and drags a component from the pallet to the canvas one at a time to create a compressed air system layout in simulation space. An example of this process today would be: click and drag compressor on canvas, click and drag pipe on to canvas, click and drag refrigerated dryer onto canvas, and so on until the entire compressed air system is created. Capturing position information of compressor conduit systems and displaying that information in an application, including but not limited to a pallet and canvas style software tool, remains an area of interest. Existing systems have various shortcomings relative to certain applications. Accordingly, there remains a need for further contributions in this area of technology.

SUMMARY

One embodiment of the present invention is a unique compressor layout system having a handheld position detection device. Other embodiments include apparatuses, systems, devices, hardware, methods, and combinations for determining positions of existing compressor conduit system infrastructure. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
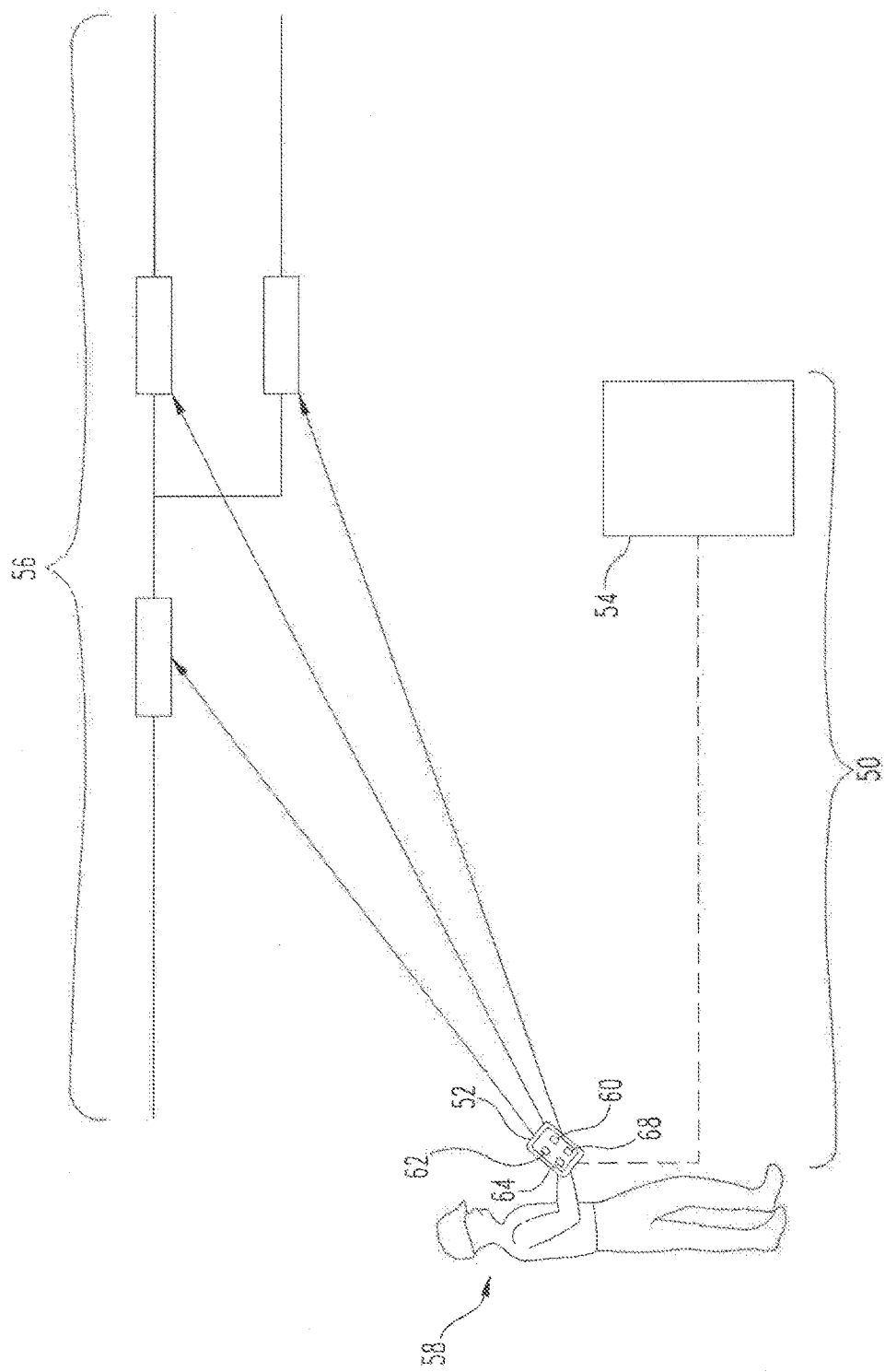
FIG. 1 depicts an embodiment of a compressor conduit layout system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a compressor conduit layout system 50 is disclosed which includes a handheld device 52 and a computer based application 54. The compressor conduit layout system 50 is useful in capturing information about a conduit system 56 via the handheld device 50 and creating and/or displaying a model of the conduit system 56 via an output device, such as a computer screen, made possible via the computer based application 54. Although the system 50 can make use of both the handheld device 52 and the computer based application 54, it will be appreciated that various embodiments can make use of only a handheld device 52 with the computer based application 54 and various features described herein integrated into the device 52. The compressor conduit layout system 50 can be used to map the conduit system 56 which may include only piping and associated components at the exclusion of any compressor related equipment such as an air receiver, compressor, dryer, separator, etc. In some applications, however, the compressor conduit layout system 50 can not only map the piping arrangement and associated components, but can also map equipment such as the aforementioned air receiver, compressor, etc. In still further applications, it may be necessary to only map existing piping arrangement and, possibly a few components, to create a map from which a compressor system layout can be built which includes new, replacement, and/or refurbished equipment.

As shown in the illustrated embodiment, a user 58 manipulates the handheld device 52 to designate certain portions of the conduit system 56, which process results in a capture of position information about each of the components as will be discussed further below. The position information of the components can then be displayed on an output device, such as a computer screen through the aid of the computer based application 54. In some forms the computer based application 54 can reside in the handheld device 52, or can be hosted in whole or in part on a standalone computer (e.g. workstation, laptop, tablet, etc) such as that described below.

Figure 2:
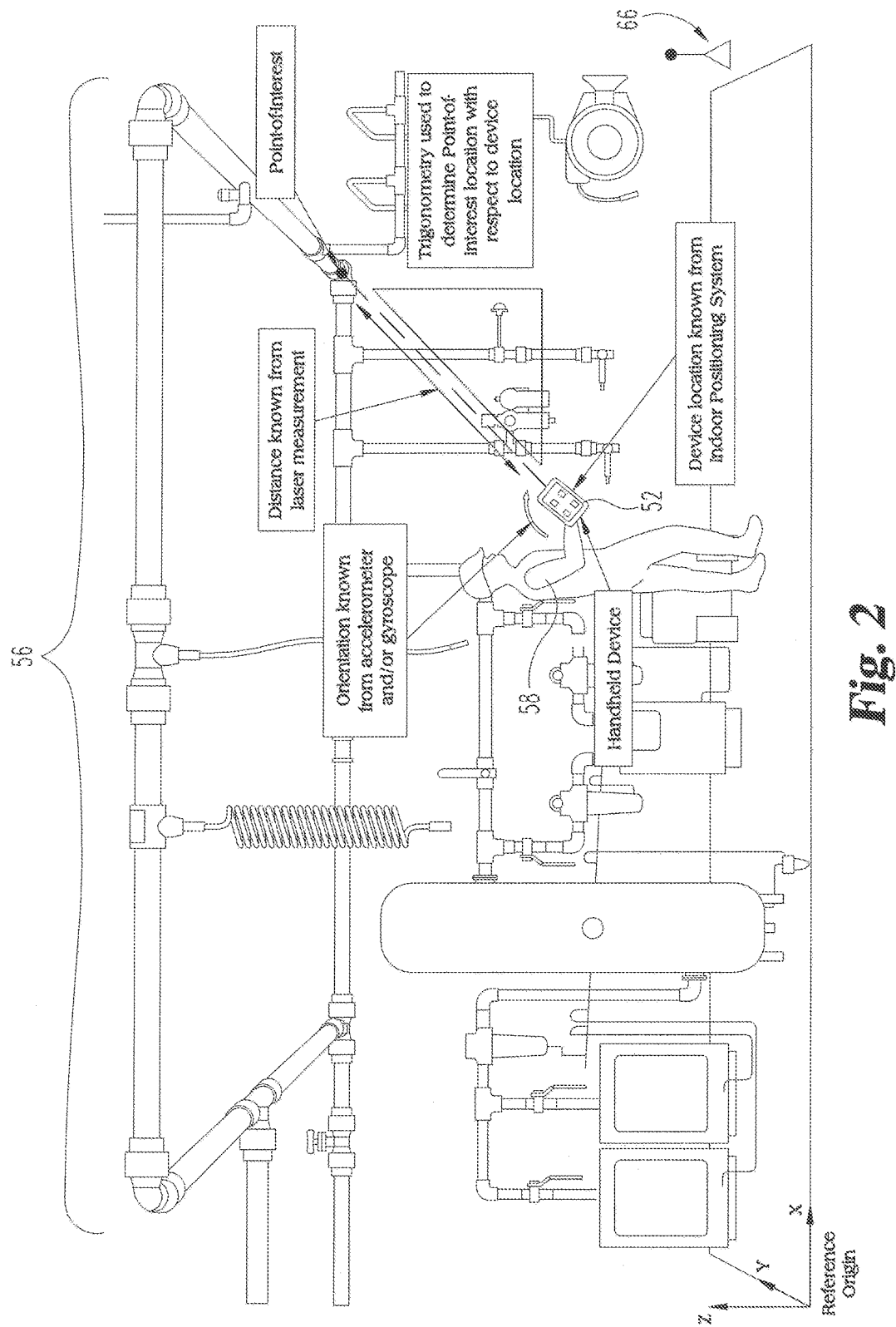
FIG. 2 depicts an illustration of a handheld device used in conjunction with an indoor positioning system.

Turning now to FIG. 2, and with continuing reference to FIG. 1, a user 58 can use the handheld device 52 to designate certain components within the conduit system 56. The handheld device 52 in any of the embodiments described herein can be any device suitable for being supported by a person such as holding the device the person's hand. The handheld device 52 can include a display (e.g. an LED display) and a manner of interacting with the device 52, such as a touch screen and/or keypad. Any variety of displays and input devices are contemplated herein. The size and weight of such devices 52 can vary, but will in many cases take the size of a handheld scanner, mobile phone, or tablet computer, among potential others. By means of nonlimiting example handheld device could refer to a completely new product developed specifically for this invention or it could refer to an existing device such as a smart phone or tablet with the integrated software of this invention. Furthermore the different embodiments discussed herein could be completely integrated into one device (e.g. the computer based application can be integrated to reside within the handheld device) or be contained in multiple devices that have the ability to share information.

The handheld device 52 can include technologies to determine relative position of objects within a field of view and/or objects that have been designated. In one nonlimiting embodiment the handheld device 52 can include a designator 60 (e.g. laser designator in the form of a laser pointer), a sensor package 62 to determine orientation of the handheld device 52, and a range finder 64. The compressor conduit layout system 50 can also include, but need not always include, a positioning system 66 useful to generate a signal that can be interpreted by a position detector 68 of the handheld device 52 to identify the spatial location of the device 52 in a given space.

The designator 60 can take on a variety of forms, all of which in general have some ability to detect a range from the handheld device 52 to a point of interest. In one form the designator 60 can take the form of a laser dot emitted from the handheld device 52 that is visible to a user 58 of the device 52. The designator 60 can also take the form of an optical device having a cross hair or other useful reticle in a view scope, or a digital image, etc that the user 52 can place over the point of interest to designate the point for later use as will be discussed below. The designator 60 can include a button, trigger, or other device (either physical incorporated into the device 52 or digitally represented on a screen of the device 52, for example) to 'mark' the point of interest and cause other activities to follow, such as determining the position of the point of interest using one or more of the techniques below.

The sensor package 62 is used to provide spatial orientation of the handheld device 52, such as when the designator 60 is used to designate a point of interest. Spatial orientation information provided by the sensor package 62 can include any number of measurements, including pitch angle (or elevation angle) sometimes denoted as θ, and heading angle sometimes denoted as Either or both of the pitch and heading angles can be determined using information sensed via onboard sensors within the handheld device (e.g. gyroscopes, accelerometers, magnetometers, etc). Such determination of orientation of the handheld device can be through direct measurements of angles, but can also be inferred or calculated using estimators. In some embodiments the pitch angle can be measured relative to a local horizontal reference frame which itself can be determined using on board accelerometers to sense direction of gravity. The heading angle can be measured relative to a compass angle (either magnetic or geodetic, for example). Other techniques of determining pitch and heading angle are contemplated herein.

The range finder 64 can be any suitable type of device capable of detecting a distance between the handheld device 52 and a point of interest designated by the designator 60. The range finder 64 can take the form of a laser range finder, but other embodiments can use other techniques including an acoustic range finder, a visual range finder, etc. In some embodiments, an embodiment of the designator 60 which uses a laser dot to visualize the designation of a point of interest can be paired with the range finder 64 to detect/measure the distance to the dot.

The positioning system can, but need not, take the form of an indoor positioning system (IPS) 66 capable of providing position coordinates such as lateral, longitudinal, and height positions relative to a reference origin. In other forms the positioning system can be an outdoor based positioning system such as those that rely exclusively upon global positioning system satellite signals. The indoor positioning system can utilize one or more systems to assist in determining position, such as, but not limited to: Wi-Fi based systems, Bluetooth based systems, wireless telephony based systems (e.g. 3G/4G (LTE), GSM, etc), mobile centric Wi-Fi, magnetic positioning, dead reckoning (e.g. using the last known position, possibly from an outdoor GPS signal), air pressure, barometer, accelerometer, and gyroscopes. GPS could also be used in some forms to augment one or more of the aforementioned techniques if using an indoor positioning system. In some forms the indoor positioning system 66 can operate in an enclosed space in which data from GPS is unreliable and/or unavailable. Some of the systems mentioned herein can be paired together in any given embodiment of the indoor positioning system. Companies providing indoor position systems include Wifarer, IndoorAtlas, Insoft, and Ehahau. It will be appreciated as suggested above that the indoor positioning system 66 can provide a signal which is interpreted/calculated/etc by a position detector 68 of the handheld device 52 to identify the spatial location of the device 52 in a given space.

A reference origin used by the indoor positioning system 66 can be any arbitrary location, which in some embodiments can be chosen by the user. The reference origin might also be set by the indoor positioning system itself, which in some cases can additionally and/or alternatively revert to a standard reference location (e.g. an earth centered reference point). In those embodiments in which the indoor positioning system is configured to use and/or mimic GPS coordinates, the reference origin could be an ellipsoid in which a longitude and latitude grid is imposed upon the shape, and an elevation is used above the reference ellipsoid.

The indoor position system can provide position either as an absolute position (such as but not limited to a WGS 84 position, or equivalent, available through GPS) or a relative position (such as might be measured from a reference point located somewhere in a room).

In some applications the indoor positioning system determines a position and also determines a range of error that accompanies the position. The range of error can be a circular error of probability (CEP), or similar error. Such error of position can take on any number of values depending on the type of indoor positioning system used. In one system, the error in position can be approximately one meter.

To operate the conduit layout system 50, a user 58 will use the handheld device 52 to designate a point of interest using the designator 62. Points of interest can include any variety of components including, but not limited to: a joint, pipe, filter, system control valve, drain valve, pipe elbow, regulator, system controller, gauge, valve, tank, check valve, orifice, pressure source, coupling, union, Tee, cross, cap, plug, nipple, and barb, among any variety of potentially other types.

When the point of interest has been located and designated by the user through use of the handheld device 52, the handheld device 52 is used to capture range information to the point of interest as well as orientation information of the handheld device. Given knowledge of the position of the handheld device 52 made available via interaction with the indoor positioning system 66 as described above, a position of the point of interest designated by the handheld device 52 can also be determined using range information from the device 52 coupled with the orientation of the device 52 when it is used to designate the point of interest.

FIG. 2 illustrates such a technique where an elevation angle is used to calculate, through known approaches (e.g. trigonometry) the location of the point of interest. In this simplified example, the position of the point of interest in FIG. 2 could be determined by taking the position of the handheld and adding to it the lateral and vertical delta positions of the point of interest away from the handheld device which is determined through trigonometry based upon the range and angle information. In a 3-dimensional space, orientation of the handheld 52 in pitch and heading along with range information can be used to determine any variety of other points of interest, also through known approaches. For example, the position of the point of interest can be determined using coordinate transformations. A position of the point of interest can be a relative position from the handheld device, a relative position from a point of origin of the indoor positioning system, or a position associated with an earth centered coordinate system, such as a WGS 84 coordinate, among potential others.

The second and subsequent points of interest can be determined in the same manner as above. For example, the position of a second point of interest can be determined by assessing the location of the handheld device when the second point of interest is designated, range finder distance from the handheld device to the point of interest when the second point of interest is designated, and orientation of the handheld device when the second point of interest is designated.

The position of any given point of interest can be determined by the compressor conduit layout system 50 either in the handheld device 52, or in the computer based application 54. For example, a module can be included in the handheld device 52 to operate upon the position, range, and angle information to determine the positions of each of the points of interest. Raw and/or calculated information can be provided to the computer based application 54 for immediate display. Alternatively, the computer based application 54 may include the module to receive position, range, and angle information from the device 52 and thereafter calculate position of each of the points of interest.

When a user designates a point of interest using the handheld device 52, the user can also select the type of component associated with the point of interest using a selector, either at the device 52 or the computer based application 54. A selector can be a module that provides a list of component types from which to select, and/or an ability to record (audio, visual, typewritten, etc) the type of component that is/was designated. A list of potential types of components can include one or more of the following: a joint, pipe, filter, system control valve, drain valve, pipe elbow, regulator, system controller, gauge, valve, tank, check valve, orifice, pressure source, coupling, union, Tee, cross, cap, plug, nipple, and barb, among any variety of potentially other types. The type of component can be hand typed by a user either at the handheld device or some type of computer/terminal device, and in some applications can be dictated either for transcription or later auditory review.

The computer based layout system 50 can also provide the user 58 the ability to orient the component. For example, where the component include features that have a directional nature, such as the individual legs of an elbow, the computer based layout system 50 can provide the user the ability to define the orientation of those features (e.g. one leg pointing down, the other pointing to an adjacent component). Such ability can be made available at the handheld device 52 and/or at the computer based application 54.

In some embodiments the compressor layout system 50 can include image/object recognition technologies useful to detect the type of component designated by the handheld device. For example, the instant application could make use of computer vision/recognition technologies to detect position of objects in an image scene, such as a scene that might be captured from a camera. Such technologies are currently being developed and refined in a project referred to as Google Tango that, at least in some forms, integrates technologies including one or more of the following: motion-tracking (e.g. using data from devices such as accelerometers and gyroscopes along with visual features of the scene), area learning (using past information about the environment), and depth perception (e.g. to determine sizes and distances in a scene). Such a technology could be implemented in one or both of the handheld device 52 and computer based application 54 to determine a position of an object (e.g. a relative position) as well as potentially the type of object.

Figure 3:
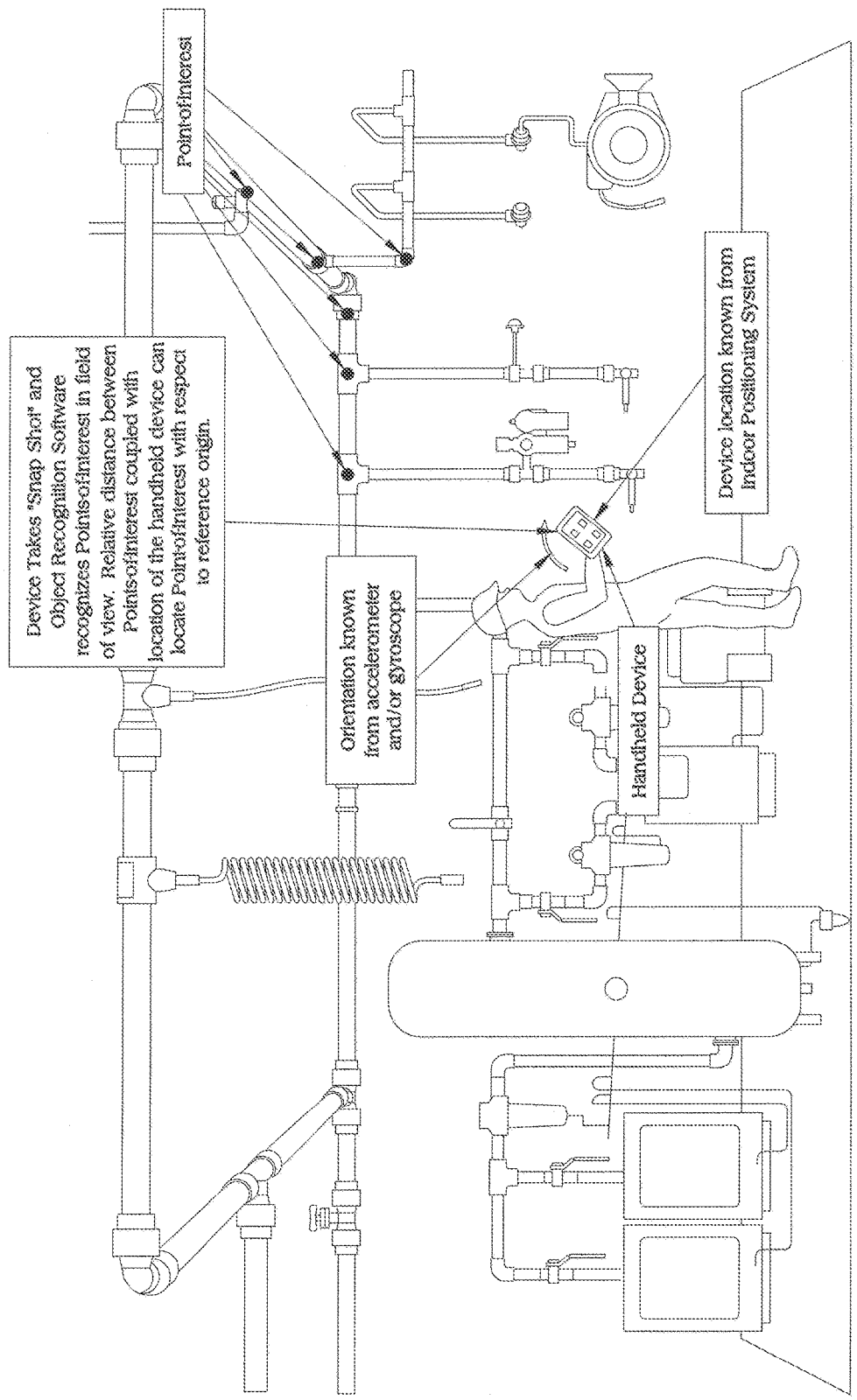
FIG. 3 depicts an illustration of a handheld device used in conjunction with image recognition.

FIG. 3 illustrates such an example of image/vision/object recognition in which the handheld device 52 includes an image capture device (e.g. a camera) with a field of view within which are several components that can be detected by the system 50 and its component type determined. In some forms the image/object recognition technology and software can process the image and identify compressed air system components within the field of view. Now, knowledge of the position in 3-dimensional space and the type of component (from the object recognition software) is known for given field of view. Embodiments described herein can be further expanded to include software that is capable of "stitching" multiple images together so a layout can be created from multiple images taken while walking around the compressed air system. As will be appreciated given the discussion above, such image/object recognition can not only include the ability to identify the type of object, but in some forms also the ability to determine the orientation of the object relative to other points of interest designated by the handheld device.

Figure 4:
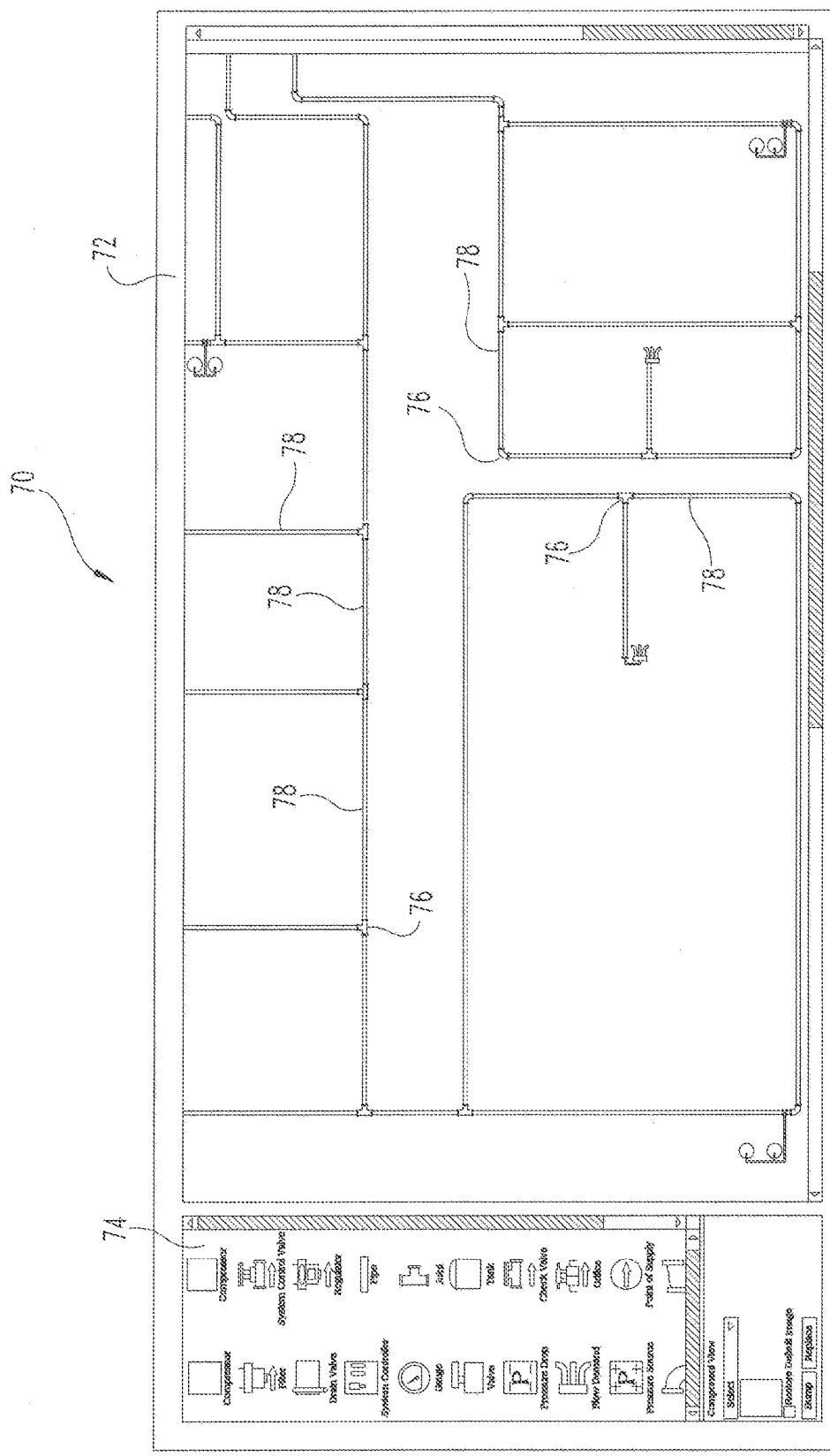
FIG. 4 depicts an embodiment of a pallet-and-canvas computer based application.

The computer based application 54 is used to display a computer based model of the conduit system 56. The computer based application 54 can be used in any number of ways, any of which can be combined with another unless inherently prohibited to the contrary. In an embodiment shown in FIG. 4, the computer based application 54 is a canvas-and-pallet type of application in which a model 70 of the conduit system 58 is displayed in a canvas 72, and various components/equipment are displayed in a pallet 74. A user of the application 54 could elect to move components/equipment from the pallet 74 to the canvas 72 to further define/refine the computer based model 70. As shown in the canvas 72, points of interest have been designated as a component 76, which are interconnected via piping 78.

It will be appreciated that the points of interest designated through use of the handheld device 52 can exist as points in a software modelling space in which interconnections between the points must be determined and/or defined, either automatically through the software or through the aid of a user. Not only can the interconnections be determined and/or defined, but in some instances the actual components that exist at the point of interest can be determined and/or defined. For example, the orientation of an elbow, with each end pointing to individual points of interest and/or oriented vertical/horizontal/etc can be determined and/or defined. The computer application can be configured to automatically orient point of interest components, but in some cases the computer application will require user input to orient the component.

Figure 5:
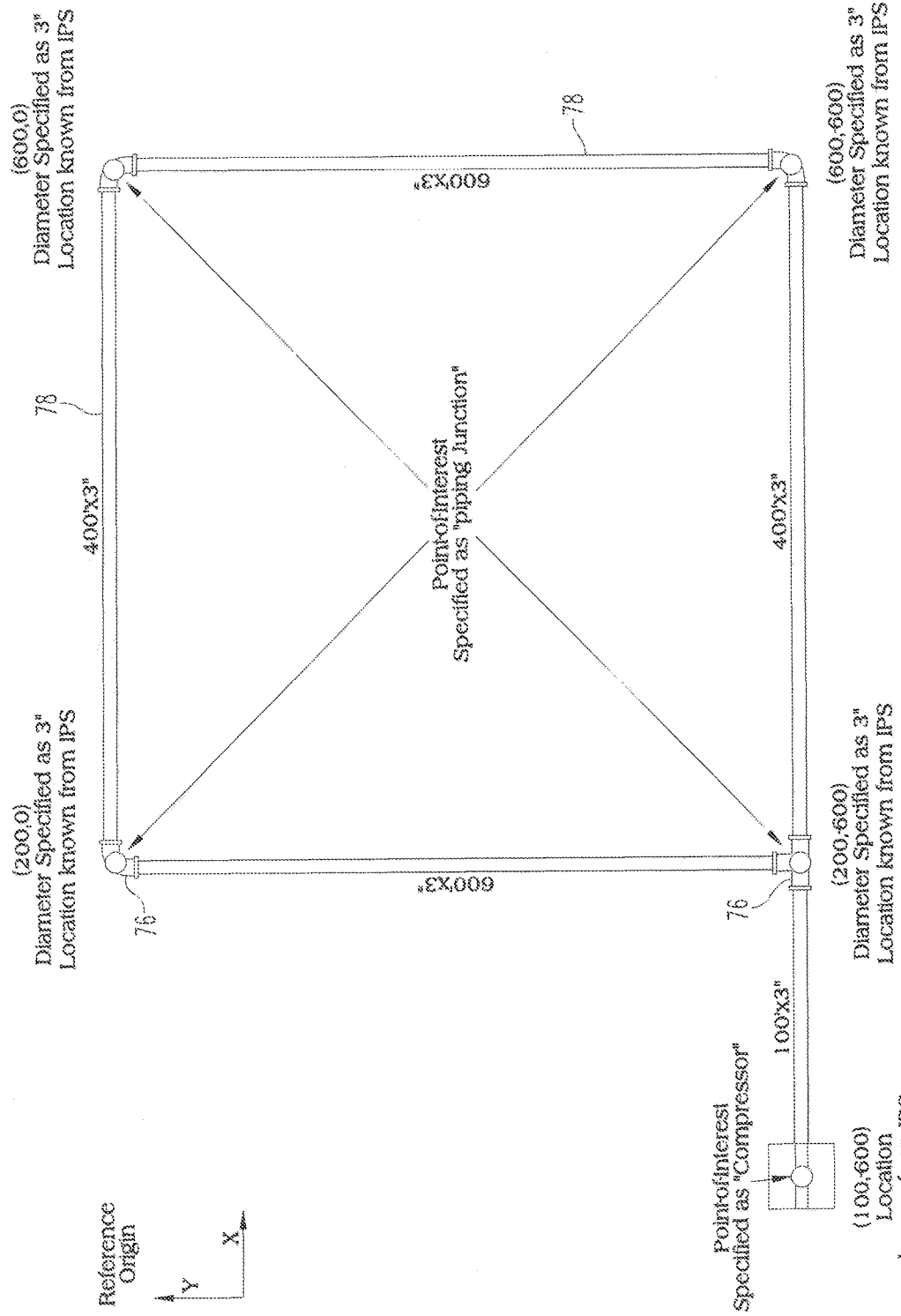
FIG. 5 depicts a layout and attributes of a conduit system 56 captured by a handheld device.

FIG. 5 depicts an example of a model 70 in which the position of the components 76 determined through the handheld device 52 are located in modelling space according to those positions. An embodiment of the compressor conduit layout system 50 can determine the pipe lengths between components 76 based upon positions of the points of interest, and the type of component 76 can be determined based upon the number and orientation of the pipes connected. In an alternative embodiment, the type of component can be set by the user. The diameter of the piping can be set by the user (or alternatively determined through object recognition), which would therefore define the diameter of the components 76, but in other embodiments the user could set the diameter of the component 76 to which the computer based application 54 can determine the diameter of the piping 78.

In an additional and/or alternative embodiment of the system 56, a line of piping can be strung together by marking, in order, components as they occur along any given route of piping when they are designated by the user 58. A route of piping could be marked by the user from a beginning point of interest to an end point of interest using the handheld device 52 in which the points of interest are associated with that particular rout. When another route is desired to be associated with points of interest, the user can mark components along that route. If a component which two separate routes of piping are marked, the software could detect such common components and automatically identify the appropriate component at the intersection (e.g. a Tee which would be the same Tee for a first line of piping through the Tee-junction, and another line of piping that extends from the Tee-junction).

Figure 6:
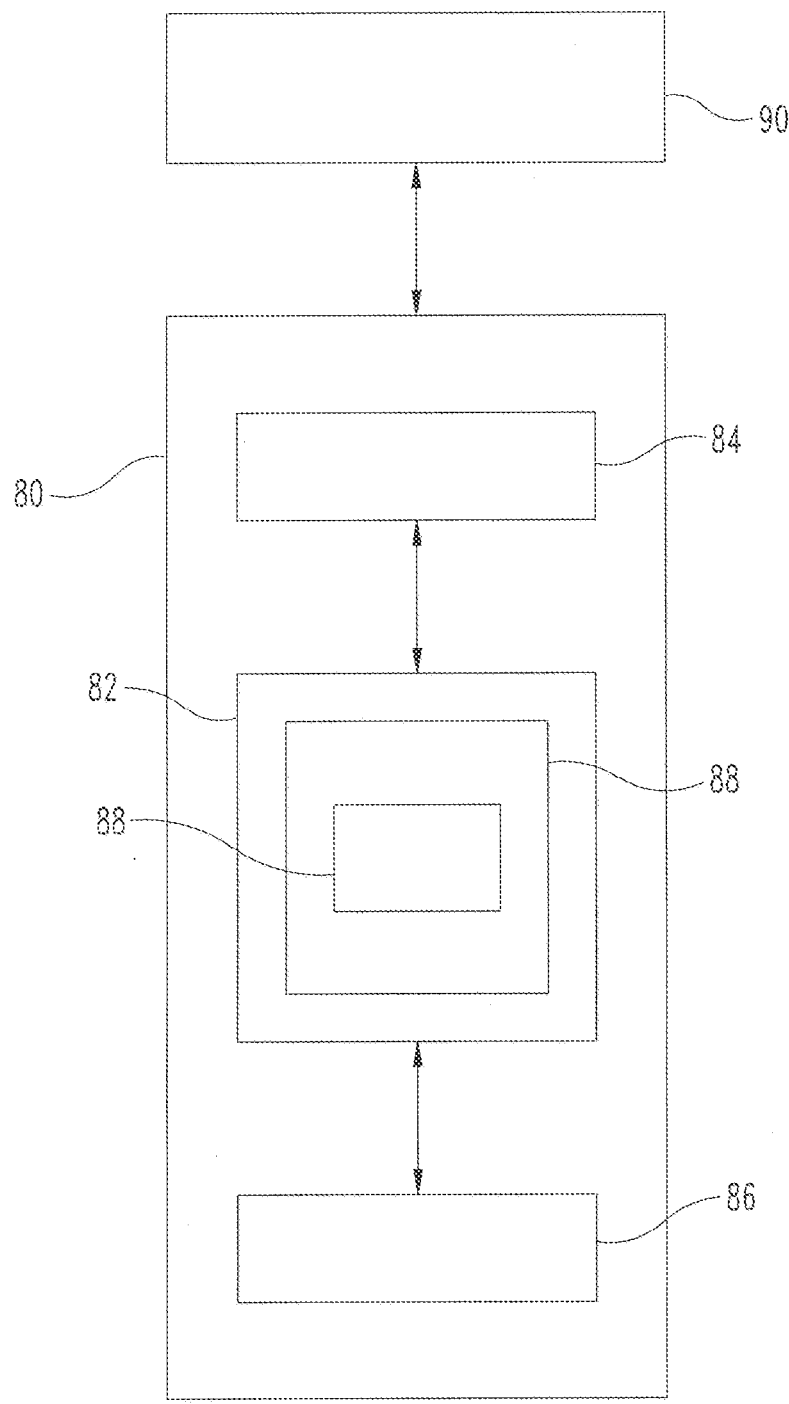
FIG. 6 depicts an embodiment computer useful in various aspects of the present application.

The computer based application 54 referred to herein can be any type of useful computer program intended to capture, display, calculate, and/or interact with a user regarding details of the compressor conduit layout system 50 captured by the handheld device 52. The computer based application 54 can be executed using any variety of computing devices (e.g. desktop personal computer, the handheld device, etc), such as that shown in FIG. 6 in one non-limiting embodiment. FIG. 6 depicts a schematic diagram of a computer 80. Computer 80 includes a processing device 82, an input/output device 84, memory 86, and operating logic 88. Furthermore, computer 80 communicates with one or more external devices 90, which in some forms are the handheld device 52.

The input/output device 84 may be any type of device that allows the computer 80 to communicate with the external device 90. For example, the input/output device may be a network adapter, network card, or a port (e.g., a USB port, serial port, parallel port, VGA, DVI, HDMI, FireWire, CAT 5, or any other type of port). The input/output device 84 may be comprised of hardware, software, and/or firmware. It is contemplated that the input/output device 84 includes more than one of these adapters, cards, or ports.

The external device 90 may be any type of device that allows data to be inputted or outputted from the computer 80. In one non-limiting example the external device 90 is the handheld device 52. To set forth just a few non-limiting examples, the external device 90 may be another computer, a server, a printer, a display, an alarm, an illuminated indicator, a keyboard, a mouse, mouse button, or a touch screen display. Furthermore, it is contemplated that the external device 90 may be integrated into the computer 80. For example, the computer 80 may be a smartphone, a laptop computer, or a tablet computer in which case the display would be an external device 90, but the display is integrated with the computer 80 as one unit, which consistent with the general design of smartphones, laptop computers, tablet computers, and the like. It is further contemplated that there may be more than one external device in communication with the computer 80.

Processing device 82 can be of a programmable type, a dedicated, hardwired state machine, or a combination of these; and can further include multiple processors, Arithmetic-Logic Units (ALUs), Central Processing Units (CPUs), or the like. For forms of processing device 82 with multiple processing units, distributed, pipelined, and/or parallel processing can be utilized as appropriate. Processing device 82 may be dedicated to performance of just the operations described herein or may be utilized in one or more additional applications. In the depicted form, processing device 82 is of a programmable variety that executes algorithms and processes data in accordance with operating logic 88 as defined by programming instructions (such as software or firmware) stored in memory 86. Alternatively or additionally, operating logic 88 for processing device 82 is at least partially defined by hardwired logic or other hardware. Processing device 82 can be comprised of one or more components of any type suitable to process the signals received from input/output device 84 or elsewhere, and provide desired output signals. Such components may include digital circuitry, analog circuitry, or a combination of both.

Memory 86 may be of one or more types, such as a solid-state variety, electromagnetic variety, optical variety, or a combination of these forms. Furthermore, memory 86 can be volatile, nonvolatile, or a mixture of these types, and some or all of memory 86 can be of a portable variety, such as a disk, tape, memory stick, cartridge, or the like. In addition, memory 86 can store data that is manipulated by the operating logic 88 of processing device 82, such as data representative of signals received from and/or sent to input/output device 84 in addition to or in lieu of storing programming instructions defining operating logic 88, just to name one example. As shown in FIG. 2, memory 86 may be included with processing device 82 and/or coupled to the processing device 82.

The handheld device 52 can have one or more similar characteristics of the computer 80 described above. No limitation is intended to confine the handheld device 52 to any particular type of device. Data from the handheld device 52 can be provided to the computer based application 54 using any variety of techniques. For example, data can be transmitted over a wired or wireless link, a memory module (e.g. USB stick) can be removed from the handheld device 52 and connected to a computer 80 that either hosts the computer based application 54 or is in communication with the computer based application, etc. A combination of two or more of the above-mentioned techniques of conveying information from the device 52 to the application 54 are contemplated herein.

The compressor conduit layout system 50 could be a software add-on or additional feature within the existing Air System Modeling and Simulation software. The embodiments described herein can, but need not, use a combination of technologies to quickly and easily create a representative 2 or 3 dimensional schematic of a compressed air system found in industrial and other applications. Applicable technologies as described herein include indoor positioning systems (IPS), accelerometer and/or gyroscope technology for handheld devices, laser measurement technology, and in some forms object recognition technology.

IPS technologies enabled on a handheld device allow the user to mark points of interest in a compressed air system during a walk through. Points of interest in this context refers to points in the system where major components exist such as but not limited to compressors, dryers, filters, valves, and where piping changes direction or size (in addition to any other component previously mentioned or contemplated). As the user marks these points they may be required in some embodiments to specify the point type such as compressor, filter, or piping junction and the diameter of the component, etc, etc. As the user physically marks these points of interest the coordinates can be saved to a software application (e.g. on the handheld device 52 or possibly a stationary device such as but not limited to the computer 80) where the user can connect the points to create the system. In some forms the points of interest in the compressed air system can refer to everything except straight pieces of pipe. The connections made between the points of interest in the accompanying software can be representative of the straight pipes and because the coordinates and diameters of all of the points of interest can be known, the length and diameter of the pipe can be automatically calculated and determined by the software. Furthermore, elbows and tees can be defined in the layout when connections are made between points of interest that result in intersecting pipes. The software can also be intelligent enough to warn the user if two points of interest of different diameters are connected. In this scenario the software could be structured in such a way as to ask the user if they would like to place a transition in the layout to account for the diameter change or, in the case of a tee junction, the software could adjust the branch and through pipe diameters of the tee accordingly.

One aspect of the present application includes an apparatus comprising a handheld device structured to communicate with an indoor positioning system and having a designator for selecting a point of interest in a compressor conduit system having an arrangement of fluid flow components, a selector for identifying the type of point of interest from among a list of potential types, a rangefinder for determining a distance to the point of interest from the handheld device, and a sensor package for determining spatial orientation from the handheld device to the point of interest, the handheld device capable of determining its position relative to an origin using information from the indoor positioning system, and a computer based application structured to construct a model of the compressor conduit system based upon data collected by the handheld device from a plurality of points of interest, the computer based application further including a menu of potential compressor components that can be added to the model.

A feature of the present application further includes the indoor positioning system, the indoor positioning system structured to provide a position reference system from which locations within a local space can be determined.

Another feature of the present application includes wherein the indoor positioning system is structured to operate independent of a global positioning system, and wherein the spatial orientation of the handheld includes elevation angle and heading angle.

Still another feature of the present application includes wherein the handheld device further includes a selector structured to define the type of device associated with the point of interest from a menu of devices.

Yet another feature of the present application includes wherein the computer based system provides the user with an option of selecting an operating orientation of a component at the point of interest.

Still yet another feature of the present application includes wherein the type of point of interest is at least one of a conduit elbow, a conduit Tee, valve, joint, pipe, filter, system control valve, drain valve, pipe elbow, regulator, system controller, gauge, valve, tank, check valve, orifice, pressure source, compressor, dryer, after cooler, moisture separator, and flow demand.

Yet still another feature of the present application includes wherein the computer based application presents the user with a model including the points of interest with associated type of component, along with associated attributes.

A further feature of the present application includes wherein the associated attributes include one or more of: pipe sizing, material type, and orientation. Such attributes can include component performance details and settings when applicable. For example, compressor and dryer performance information (100 psi, 1000 cfm, etc) as well as adjustable settings such as load and unload pressures which are configurable on the physical compressor can be noted as an attribute. Information like this is can be used in simulation software and therefore could be captured via user input (typing, drop down selection, etc.) in embodiments discussed above.

A still further feature of the present application includes wherein the computer based system calculates pipe distances between the points of interest, and wherein the indoor positioning system is structured to operate in conjunction with a global positioning system.

Another aspect of the present application includes an apparatus comprising a compressor layout creation system configured to detect exiting compressor piping network and construct a computer based model therefrom, a handheld device structured to operate with an indoor positioning system to detect a position of the handheld device, the handheld device further including a designator for selecting a point of interest, a range finder determining a range finder distance between the handheld device and the point of interest when designated by the designator, and a sensor package for detecting orientation of the handheld device relative to a reference frame when the point of interest is designated by the designator, and a computer based application structured to receive data from the handheld device, the computer based application configured to receive data from the handheld device, wherein the compressor layout creation system is structured to capture data regarding n points of interest when each of the n points of interest are designated by the designator, and wherein the compressor layout system further includes a module for determining position information of each n point of interest by using range finder distance of each n point of interest, orientation of the handheld device when each n point of interest is designated, and position information of the handheld device when each n point of interest is designated.

A feature of the present application includes wherein position information of the n points of interest is expressed in a local coordinate system apart from a global positioning system.

Another feature of the present application includes wherein orientation of the handheld device is pitch angle relative to a reference frame and heading angle relative to the reference frame.

Still another feature of the present application includes wherein the computer based application is structured to be in data transmission communication with the handheld device.

Yet another feature of the present application includes wherein the data is wirelessly transmitted in real-time to the computer based application.

Still yet another feature of the present application includes wherein the module for determining position information is internal to the handheld device, and which further include object recognition technology to detect the points of interest.

Yet still another feature of the present application includes wherein the module for determining position information is included with the computer application and receives data captured from the handled.

A further feature of the present application includes wherein the compressor layout system further includes a selector structured to define the type of device associated with the point of interest.

A still further feature of the present application includes wherein the compressor layout system further provides a user option to orient the type of device in model space.

Yet still a further feature of the present application includes wherein the computer based application presents the user with a model including the points of interest with associated type of component, along with associated attributes to be further defined by the user, and wherein position information of the n points of interest is expressed in a coordinate system associated with a global positioning system.

Yet another aspect of the present application includes a method comprising: determining a position of a handheld device using data made available via an indoor positioning system, designating a first point of interest in an indoor compressor conduit system using the handheld device, the device including a laser designator, a range finder for determining distance between the handheld device and the point of interest, and a sensor package structured to determine orientation of the handheld device relative to a reference frame, determining a first position of the first point of interest in the indoor compressor conduit system based upon range finder distance and orientation of the handheld device, designating a second point of interest in the indoor compressor conduit system using the handheld device, and determining a second position of the second point of interest based upon range finder distance of the second point of interest, orientation of the handheld device when the second point of interest is designated, and position information of the handheld device.

A feature of the present application includes configuring the indoor positioning system to provide a reference origin for purposes of mapping an indoor space that includes the indoor compressor conduit system, and which further includes designating a plurality of additional points of interest in the indoor compressor conduit system.

Another feature of the present application further includes selecting a component type of each of the first, second, and plurality of additional points of interest associated with the indoor compressor conduit system, and which further includes orienting each of the first, second, and plurality of additional points of interest, and which further includes displaying the first, second, and plurality of additional points of interest using a computer based application in which additional component types are available via a pallet.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Additionally, unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:
   a handheld device structured to communicate with an indoor positioning system and having a designator for selecting a point of interest in a compressor conduit system having an arrangement of fluid flow components, a selector for identifying the type of point of interest from among a list of potential types, a rangefinder for determining a distance to the point of interest from the handheld device, and a sensor package for determining spatial orientation from the handheld device to the point of interest, the handheld device capable of determining its position relative to an origin using information from the indoor positioning system; and
   a computer based application structured to construct a model of the compressor conduit system based upon data collected by the handheld device from a plurality of points of interest, the computer based application further including a menu of potential compressor components that can be added to the model.

2. The apparatus of claim 1, which further includes the indoor positioning system, the indoor positioning system structured to provide a position reference system from which locations within a local space can be determined.

3. The apparatus of claim 2, wherein the indoor positioning system is structured to operate independent of a global positioning system, and wherein the spatial orientation of the handheld includes elevation angle and heading angle.

4. The apparatus of claim 1, wherein the handheld device further includes a selector structured to define the type of device associated with the point of interest from a menu of devices.

5. The apparatus of claim 4, wherein the computer based system provides the user with an option of selecting an operating orientation of a component at the point of interest.

6. The apparatus of claim 5, wherein the type of point of interest is at least one of a conduit elbow, a conduit Tee, valve, joint, pipe, filter, system control valve, drain valve, pipe elbow, regulator, system controller, gauge, valve, tank, check valve, orifice, pressure source, compressor, dryer, after cooler, moisture separator, and flow demand.

7. The apparatus of claim 1, wherein the computer based application presents the user with a model including the points of interest with associated type of component, along with associated attributes.

8. The apparatus of claim 7, wherein the associated attributes include one or more of: pipe sizing, material type, and orientation.

9. The apparatus of claim 8, wherein the computer based system calculates pipe distances between the points of interest, and wherein the indoor positioning system is structured to operate in conjunction with a global positioning system.

10. An apparatus comprising:
    a compressor layout creation system configured to detect exiting compressor piping network and construct a computer based model therefrom, a handheld device structured to operate with an indoor positioning system to detect a position of the handheld device, the handheld device further including a designator for selecting a point of interest, a range finder determining a range finder distance between the handheld device and the point of interest when designated by the designator, and a sensor package for detecting orientation of the handheld device relative to a reference frame when the point of interest is designated by the designator; and a computer based application structured to receive data from the handheld device, the computer based application configured to receive data from the handheld device;

wherein the compressor layout creation system is structured to capture data regarding n points of interest when each of the n points of interest are designated by the designator, and wherein the compressor layout system further includes a module for determining position information of each n point of interest by using range finder distance of each n point of interest, orientation of the handheld device when each n point of interest is designated, and position information of the handheld device when each n point of interest is designated.

11. The apparatus of claim 10, wherein position information of the n points of interest is expressed in a local coordinate system apart from a global positioning system.

12. The apparatus of claim 11, wherein orientation of the handheld device is pitch angle relative to a reference frame and heading angle relative to the reference frame.

13. The apparatus of claim 10, wherein the computer based application is structured to be in data transmission communication with the handheld device.

14. The apparatus of claim 13, wherein the data is wirelessly transmitted in real-time to the computer based application.

15. The apparatus of claim 13, wherein the module for determining position information is internal to the handheld device, and which further include object recognition technology to detect the points of interest.

16. The apparatus of claim 12, wherein the module for determining position information is included with the computer application and receives data captured from the hand held device.

17. The apparatus of claim 10, wherein the compressor layout system further includes a selector structured to define the type of device associated with the point of interest.

18. The apparatus of claim 17, wherein the compressor layout system further provides a user option to orient the type of device in model space.

19. The apparatus of claim 18, wherein the computer based application presents the user with a model including the points of interest with associated type of component, along with associated attributes to be further defined by the user, and wherein position information of the n points of interest is expressed in a coordinate system associated with a global positioning system.

20. A method comprising:
determining a position of a handheld device using data made available via an indoor positioning system;
designating a first point of interest in an indoor compressor conduit system using the handheld device, the device including a laser designator, a range finder for determining distance between the handheld device and the point of interest, and a sensor package structured to determine orientation of the handheld device relative to a reference frame;
determining a first position of the first point of interest in the indoor compressor conduit system based upon range finder distance and orientation of the handheld device;
designating a second point of interest in the indoor compressor conduit system using the handheld device; and
determining a second position of the second point of interest based upon range finder distance of the second point of interest, orientation of the handheld device when the second point of interest is designated, and position information of the handheld device.

21. The method of claim 20, which further includes configuring the indoor positioning system to provide a reference origin for purposes of mapping an indoor space that includes the indoor compressor conduit system, and which further includes designating a plurality of additional points of interest in the indoor compressor conduit system.

22. The method of claim 21, which further includes selecting a component type of each of the first, second, and plurality of additional points of interest associated with the indoor compressor conduit system, and which further includes orienting each of the first, second, and plurality of additional points of interest, and which further includes displaying the first, second, and plurality of additional points of interest using a computer based application in which additional component types are available via a pallet.

* * * * *